Feb. 24, 1959　　　G. E. MALLINCKRODT　　　2,874,920
AIRCRAFT
Filed Oct. 20, 1955　　　　　　　　　　2 Sheets-Sheet 1
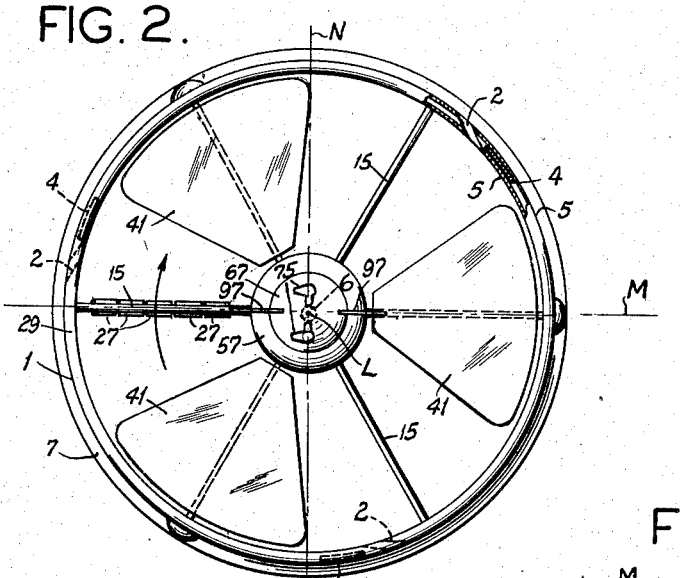
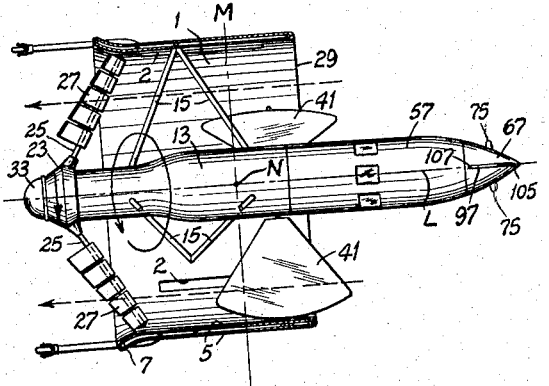
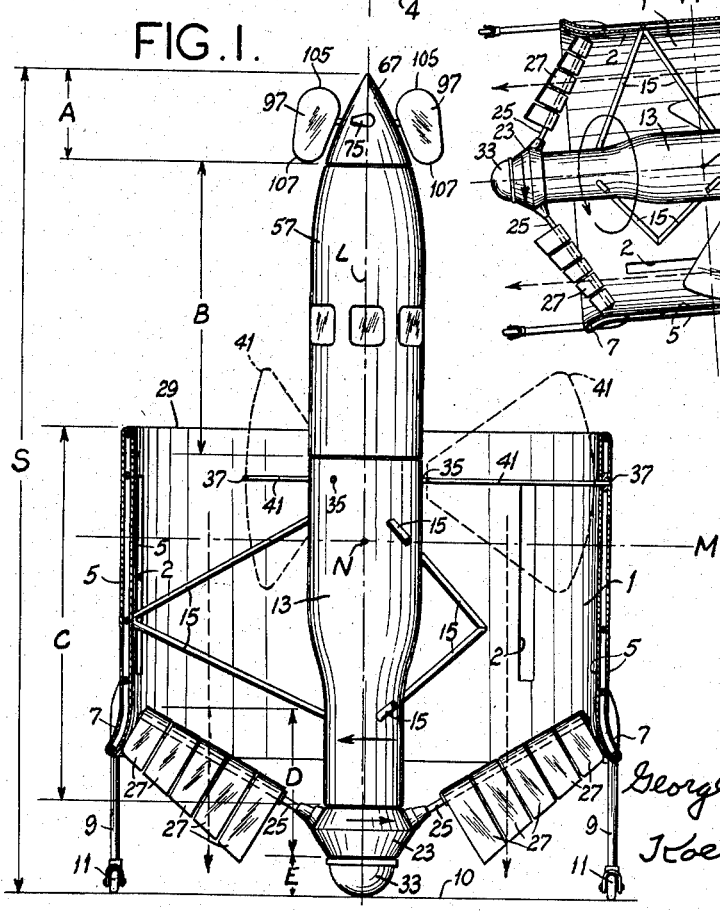
George E. Mallinckrodt,
Inventor.
Koenig and Pope,
Attorneys.

Feb. 24, 1959     G. E. MALLINCKRODT     2,874,920
AIRCRAFT
Filed Oct. 20, 1955     2 Sheets-Sheet 2

George E. Mallinckrodt,
Inventor.
Koenig and Pope,
Attorneys.

United States Patent Office 2,874,920
Patented Feb. 24, 1959

2,874,920

AIRCRAFT

George E. Mallinckrodt, St. Louis, Mo.

Application October 20, 1955, Serial No. 541,757

8 Claims. (Cl. 244—23)

This invention relates to aircraft, and with regard to certain more specific features, to aircraft combining in flight both helicopter and airplane aerodynamic characteristics, with gyroscopic control for maneuvering along a desired trajectory.

Among the several objects of the invention may be noted the provision of a safe and stable aircraft adapted aerodynamically for vertical take-off as a helicopter and for subsequent transverse cruising movements as an airplane; the provision of aircraft of the class described having means for stabilizing conditions at take-off for vertical ascent; the provision of an aircraft of the class described in which operating maneuvers may be made by simple and easily instigated gyroscopic control under very stable conditions; and the provision of aircraft of the class described which may be safely landed from any elevation, whether or not its power plant is operative. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a side elevation of my new aircraft in take-off position, the dotted-line sectors showing alternate positions of certain lifting surfaces;

Fig. 2 is a top plan view of Fig. 1, certain edge parts of an airfoil barrel being broken away to show an airfoil slot and control gate therefor;

Corresponding reference characters indicate corresponding parts throughout the several views of the drawings.

Figure 3:
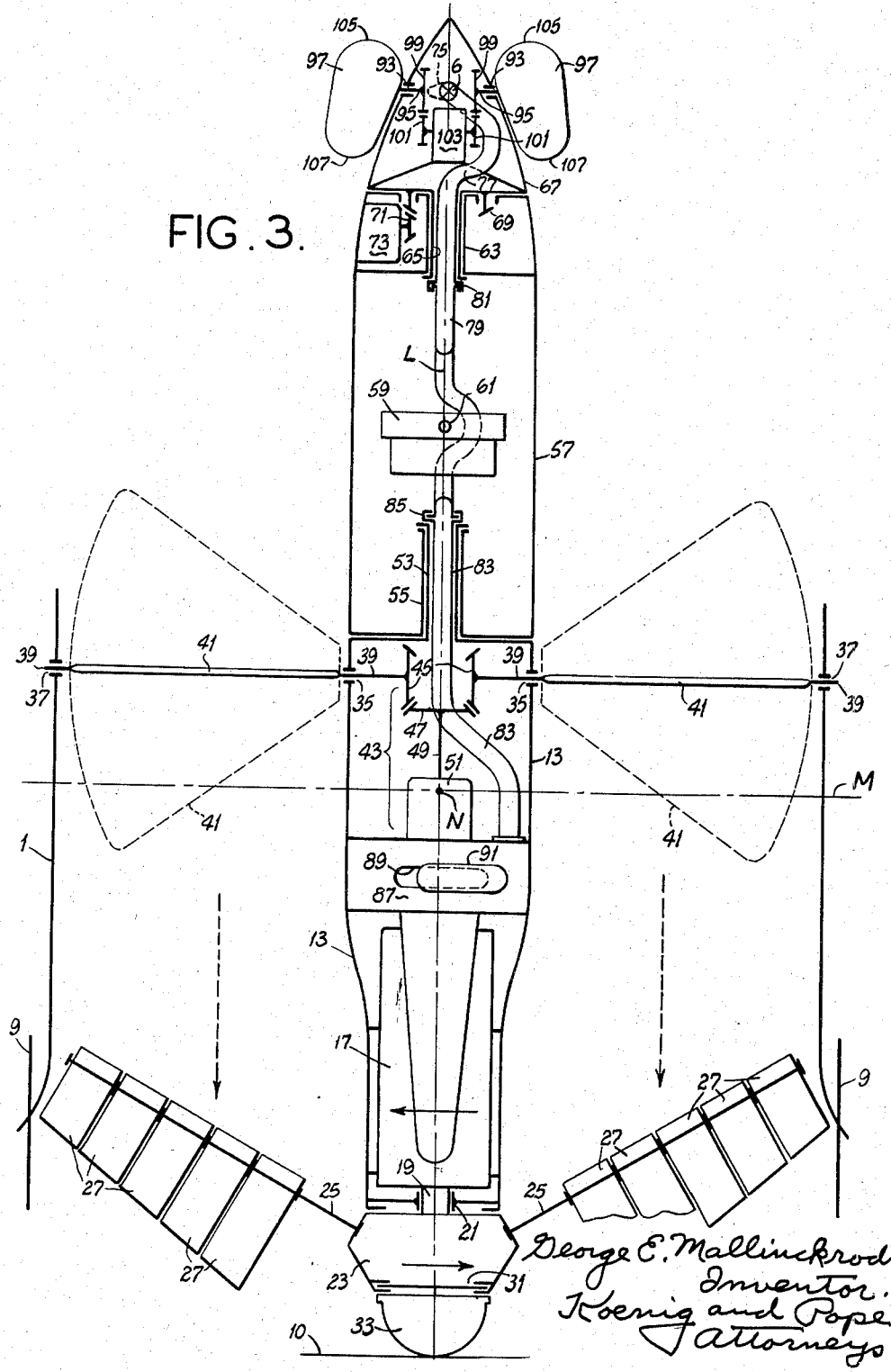
Fig. 3 is a schematic layout developed in the plane of the paper of various operating elements; and, Fig. 4 is a side elevation showing the aircraft in cruising position with certain elevators turned 90° from their positions shown in Fig. 1.

Referring now more particularly to Figs. 1 and 2, there is shown at numeral 1 a cylindrical airfoil forming a barrel type of wing which, for example but without limitation, may be on the order of 15 feet in diameter. It is preferably circular in right section, although equivalent multi-sided polygonal forms may be used. While the barrel wing 1 is shown with axially straight sides, it will be understood that the barrel shape may be bulged or constricted along its length for any desired aerodynamic action. The wall of the barrel wing 1 is provided with a smooth skin 5 for minimizing air friction. This wall is axially slotted, as shown at 2, for air boundary layer control. Control gates 4 are provided for the slots 2. The bottom, or rear, end of the barrel wing 1 may be flared as shown at 7, and is provided with steadying posts 9 at the lower ends of which are antifriction swiveling rollers or casters 11.

Mounted within and coaxially on the central axis of the barrel wing 1 is an over-all assembly S having sections A, B, C, D and E. Rotary section C is constituted by a compartment 13 attached to the barrel wing by means of radial bracing 15. Thus the compartment 13 and the barrel wing 1, with attached parts, form an aggregate structure which, as will appear, is rotary. Within the compartment 13 is located an engine 17, having a drive shaft 19 extending from compartment 13 through a bearing 21. The usual power shaft of the engine and its frame constitute first and second relatively rotary reactive thrust components respectively. The second of these components belongs to the rotary section C.

Attached exteriorly to the drive shaft 19 is a hub 23 of a propeller assembly made according to the disclosure in Figs. 1–3 of my United States patent application Serial No. 526,984, filed August 8, 1955 (file 6118). The propeller or first assembly constitutes what will be referred to as section D and includes the engine power shaft or first thrust component of the engine. Briefly, this propeller assembly includes a hub 23, fixed radial arms 25, and on each arm a series of freely swingable individual airfoils 27. Further details regarding the construction and operation of the propeller components may be obtained from said application, but it suffices here to state that upon rotation by the power plant 17, the propeller assembly of section D will induce a stream of air flowing from what will be referred to as the top or forward end 29 of the barrel wing 1 and out of its bottom or rear flared end 7 (see the dotted arrows). It will be understood that any conventional type of propeller may be used.

Mounted upon a freely rotary bearing 31 of the hub 23 is a bottom supporting spherical nose rest 33 constituting (with rollers 11) a supporting section E. These support the apparatus for rotation when the machine is grounded. The rollers 11 on supports 9 at this time function as lateral antifriction steady rests.

Supported upon transverse bearings 35 in the compartment 13 and transverse bearings 37 in the barrel wing 1 (Fig. 3) are transverse control shafts 39 for a plurality (three, for example) of equally spaced relatively large sector-shaped lifting airfoils 41. Other numbers of the foils 41 may be used. The shafts 39 are provided within the compartment 13 with control means 43 for angularly changing the positions of the airfoils 41 around the axes of their respective shafts 39. This is for the purpose of changing the angles of attack of the airfoils, as will appear. The control means 43 may be constituted by bevel gears 45 on the shafts 39, interconnected by means of a bevel gear 47 driven through a shaft 49 by a suitable motorized control 51.

The compartment 13 carries a cylindrical hollow journal extension 53, forming a hollow journal for an outer rotary bearing sleeve 55 of a load compartment or housing 57 forming section B. At 59 is shown a gimbal, swung on pivots 61 within the compartment 57 for supporting the pilot seat, not shown. Similar gimbals may be employed for other passengers and/or loads, if desired.

At the upper end of the compartment 57 is a bearing 63 containing a journal 65 extending from a third or nose assembly 67 adapted either to be rotated or held fast to the compartment 57. This nose assembly constitutes section A. Rotation, or holding of assembly 67, may be accomplished by a bevel gear 69 attached to the nose assembly, meshing with a bevel pinion 71, the latter being adapted to be held fast, or rotated from a motorized control 73. Thus when the pinion 71 is stationary, the nose assembly 67 is held stationary on the compartment 57. On the other hand, by rotating the pinion 71, the nose assembly 67 may be adjusted with respect to the compartment 57 into any position over a 360° range.

At 75 are shown two jet-forming nozzles having tangential outlets projecting in the same direction on opposite sides of the center line L, referred to below as the axis of spin. The nozzles are branch connected with a common pipe 77. Valve means 6, associated with the branch connection, upon suitable adjustment allows gas in variable amounts to be directed to either or both nozzles 75. By directing gas to one nozzle only, or to one more than the other, the resulting reactive torque is applied around axis L to the nose assembly 67 alone (when free of 57) and also to the compartment 57 when 67 and 57 are held together (pinion gear 71 held stationary). Moment may also be applied to tilt the axis L by directing equal amounts of gas to both nozzles 75, which then react together in the same tilting direction relative to the axis of spin L. Ejection of gas from the nozzles 75 for jet reactive purposes is obtained from pipe 77 leading through the hollow journal 65. This pipe 77 connects with a pipe 79 in the compartment 57 through a rotary joint 81. Pipe 79 connects with a pipe 83 by means of a rotary joint 85. Pipe 83 passes from the compartment 57 through the hollow journal 53 and connects with an exhaust manifold 87 of the engine 17. Thus exhaust gas pressure may be applied to deliver exhaust gas to the nozzles 75. It will be understood that the reaction required to be obtained from the jet from nozzles 75 is relatively small for accomplishing the functions to be described. Control of the volume of gas expressed from the nozzles is obtained by controlling the flow of gases through pipes 83, 79 and 77. This may be effected by throttling one of the exhaust ports 89 of the engine by a movable cutoff gate 91 which builds up the desired back pressure for escape at 75.

Near the front of the nose assembly 67 are transverse bearings 93 for transverse shafts 95 of airfoils 97 adapted to function as elevators or ailerons. Rotary adjustments of the shafts 95 may be accomplished independently or together, in order that the elevators 97 may be angled together (as elevators) or independently of one another (as ailerons). This may be accomplished by gears 99 supported on shafts 95 meshed with gears 101, the rotations of which may be independently controlled from a motorized control 103. Thus the nose assembly 67 may be referred to as an elevator and aileron assembly which is rotatable on the housing 57.

It will be understood that suitable electrical means may be interconnected to the various motorized controls from compartment or housing 57, so that a pilot from a location therein may control the various elements described. Further details of these electrical means, motorized controls, means for generating current therefor from the power plant 17, batteries and the like will not be necessary, since their provision is within the skill of those familiar with the aeronautical art.

Operation is as follows:

Assume that the machine is standing vertically at rest on the nose rest 33 and laterally steadied by means of the posts 9 and rollers 11; engine 17 dead. The surface 10 upon which it rests should preferably be level and smooth to permit rolling of the casters 11. The lifting airfoils 41 are set into the solid-line position shown in Figs 1, 2 and 3 at or near a horizontal plane with an angle of attack near zero. The elevators 97 are set into a vertical plane containing the axis L. The engine 17 is then started, which provides rotary reaction between the propeller assembly of section D and the assembly of section C. The result is rotation in one direction of the former and in the opposite direction of the latter.

Hereinafter any rotation referred to as being absolute means rotation with respect to the earth. All other motions are referred to as being relative between parts referred to in context. Assume the relative motion between the engine compartment 13 and the propeller assembly to be 500 R. P. M. The moment of inertia of the second assembly constituting section C on the one hand (compartment 13 with engine and other parts attached thereto exclusive of its shaft, including barrel wing 1 and airfoils 41) is substantially larger than the moment of inertia of the propeller or first assembly (forming section D and including the engine shaft) on the other hand. Therefore, when the engine 17 is started, the propeller assembly of section D will initially rotate rapidly in one direction with respect to the earth (say at 500 R. P. M.). The assembly C will slowly rotate in the opposite direction relative to the earth. The bottom nose rest 33 of section E will be stationary or nearly so. As reaction continues between the assemblies, the assembly of section C, including barrel wing 1, gradually accelerates in the angular direction opposite to the direction of rotation of the lighter assembly of section D. Enough exhaust gas is allowed to eject from an appropriate one of the nozzles 75 to prevent sections B and A from following the rotation of section C. If the rotation of assembly C is as shown by the arrow in Fig. 1, then the forward one of the nozzles 75 showing in Fig. 1 is operative for this purpose.

Acceleration is permitted to continue until the angular momentum of the assembly constituting section C builds up substantially, which, for example, will occur at an attained absolute angular velocity on the order of 200 R. P. M. for section C. In the meantime, assuming a relative angular velocity of 500 R. P. M. between assemblies of sections C and D, the absolute angular velocity of the propeller assembly of section C will have become reduced from 500 R. P. M. to 300 R. P. M. During the time that the absolute angular velocity of the propeller assembly exceeds 300 R. P. M., there may be a tendency for the craft to lift, by reason of the down draft of air induced through the barrel wing 1. This may be offset by initial adjustments of the airfoils 41 to provide a small negative angle of attack of these, so as to give a downward reaction to offset the upward reaction from the air stream induced by the propeller assembly. In any event, with the airfoils 41 set into their near-horizontal positions, efficient flow of an air stream through the barrel wing 1 is substantially interfered with, so that the lifting effect of the propeller assembly at this stage is relatively small. Under the stated conditions, then, the machine will not rise and the pilot has time within which to test the proper functioning of various parts and to obtain steady-state operating conditions. Among other things, the gas control gate 91 may be adjusted so that the absolute angular velocity in space of the assembly B containing compartment 57 is zero.

Thus the condition prior to an ascent is one in which a substantial momentum or kinetic energy of rotation exists in the section C. Upon increase of the angle of attack of airfoils 41 the craft rises, the engine supplying kinetic energy to the rotary system as fast as it is drawn off by the process of conversion to potential energy of elevation. It will be observed that during vertical lift, the thrust which overcomes weight is due approximately one-half to that from the lifting airfoils 41 (set at a positive angle of attack) operating as helicopter blades, the additional one-half of the thrust being obtained from the propeller assembly in section D.

As the machine rises vertically along its axis of spin L, a desired elevation along its vertical trajectory will be traversed. At an appropriate elevation for cruising, the elevators 97 amy be adjusted out of the plane containing axis L. Assume, for example, that they are adjusted with their leading edges 105 in positions below the plane of the paper and their trailing edges 107 above the plane of the paper. This will result in a torque due to air reaction being applied around axis M drawn through the center of gravity of the craft. This tends slightly to rotate the machine in a plane containing L and normal to the surface of the paper around the axis of applied torque M. The resulting small rotation in this plane is resisted by the substantial reactive gyroscopic couple of the spinning system constituted by section C. The result is a relatively prompt gyroscopic precession of the machine as a whole in a clockwise direction in the plane of the paper around an axis of precession N which is drawn normal to the axes L and M. This places the aircraft in the aspect suggested in Fig. 4, with its axis of spin L at a small angle to the horizontal. Since the moment of inertia of the propeller assembly is comparatively small, any opposite precessive tendency, due to its opposite rotation, is small and not controlling of the main effect stated.

After the precession has been allowed to continue until the craft assumes the desired position of axis L near the horizontal, the barrel wing 1, by reason of its linear velocity through the air, suspends the craft. Some lifting effect is also obtained from the air attack aspect of the fuselage of the parts 67, 57 and 13. The airfoils 41 are at this time feathered into or near the solid positions shown in Fig. 4, and all of the thrust for propulsion is obtained from the propeller assembly of section D. At this time gravity acting on suspended parts such as gimbal 59 in housing 57 suspends the latter in a predetermined position on axis L, no action being required for this purpose from any nozzle 75. At this time also, the elevators are brought into the more or less horizontal position shown in Fig. 4. This is accomplished by operation of controls 73 and 103. When the airfoils 41 are feathered, the rotation of the assembly of section C on axis L is resisted by air friction from foils 41, so that its angular velocity may be reduced, say to 50 R. P. M. This figure is arbitrary and accords to the particular adjustments of foils 41 and the engine throttle control. Its value is selected to avoid roll-off of the barrel wing 1 crosswise of the air slip stream. The ultimate result is that under the stated 500 R. P. M., relative velocity between the propeller assembly of section D and the assembly of section C (the latter operating at 50 R. P. M. absolute), the former will have an absolute angular velocity of 450 R. P. M., for example.

From the above it is clear that when the craft is in more or less horizontal flight (Fig. 4), the necessity for applying counter torque from one of the nozzles 75 is eliminated and the compartment 57 tends to hang gravitationally from the axis L, its contained load weight being suspended below this axis.

Maneuvering along the resulting more or less horizontal trajectory also may be accomplished from the elevators 97. These may be brought into any angular position around axis L (including the more or less horizontal position of the shafts 95) by rotating the nose assembly 67 from control 73. Each is also independently adjustable on its own control shaft 95.

An important feature of the invention is the universal but stable type of maneuverability provided by the gyroscopic control resulting from the rotation on the axis of spin of the barrel wing 1 and connected parts in section C. The elevators 97 in their extended forward positions apply any acquired reaction with the air slip stream with torque over a long moment arm around axis M. The exact position of the intersection of lines L and M is of course determined by particular weight distribution throughout the craft. By temporarily adjusting elevators 97 in opposite directions, their common axis may be turned about axis L, or this may be accomplished by action of nozzles 75. After such an adjustment, the axis of applied torque M will have a new position in its plane normal to axis L. Thus it will be clear that many maneuvers may be accomplished by first changing the angular position of axis M in the stated plane, which involves oppositely turning elevators 97 or one or more nozzles 75. Then after the desired angular position of axis M has been obtained, torque may be applied around it by adjusting elevators 97 into a common plane and together giving them any desired angle of attack, which applies torque around the axis M with resulting gyroscopic precession of the axis of spin L around the third axis of precession. The resulting precession causes a new angle of attack of the barrel wing 1 relative to the air slip stream, which in turn results in the desired maneuver. For example, for a left turn from the Fig. 4 position, the elevators 97 would be adjusted for a positive angle of attack; for a right turn, a negative angle.

In order to land the craft, the nose assembly 67 is again rotated until the elevators 97 are in a more or less vertical plane. The elevators 97 are then angled together to apply more or less horizontal torque in the proper direction to provide gyroscopic precession adapted to lift the forward nose parts of the machine until axis L is substantially vertical. At this time the lifting airfoils 41 are set for a positive angle of attack and the angle decreased for gradual descent, until the nose rest 33 is brought to rest upon the earth.

Under some circumstances, it may be desirable to move more slowly in a lateral direction from a hovering position while oriented essentially as shown in Figs. 1 and 3, i. e., without turning into the cruising position shown in Fig. 4. For example, the craft may rise vertically from the ground and arrive at a hovering position at the top of an essentially vertical trajectory, after which it may be desirable slowly to move laterally. This is accomplished by causing the elevators 97, during the vertical ascent, to remain in a common plane with the axis of spin L. As a result, there will be no torque applied around any axis of applied torque M. Then in the hovering position, without further action on elevators 97, both jets 75 may be turned on, which slightly tilts axis L. The thrust of the slip stream along axis L (due to airfoils 41 and the propeller assembly of section D) will then have a small horizontal component which will drive the craft laterally at low speeds. It will be understood that by increasing the force of the jets from 75, any angle of tilt can be attained, including one for ordinary cruising such as shown in Fig. 4. From what has been said above, it will be clear that the same type of gyroscopic effects are to be expected and accounted for in determining how the nozzles 75 shall be oriented (by turning nose assembly 67) in order to obtain a desired lateral drift from a hovering position.

It will be noted that the upper end of the barrel wing 1 is above the plane of rotation of the lifting airfoils 41 when these are adjusted into or near a common plane of rotation. Thus when the aircraft in helicopter attitude moves sidewise from an approximately vertical hovering position, the barrel wing 1 acts as a surrounding shroud to guard the airfoils 41 against cross flow of air. Hence there is less likelihood of the occurrence of flutter in the airfoils 41 as might result from the crosswise air stream. Thus is eliminated the requirement for the cyclic pitch control arrangements usually used on helicopter airfoils in order to eliminate this dangerous condition. Moreover, the lower end portion of the barrel wing surrounds portions of the propeller in its rotary movement. Thus the function of the barrel wing as a shroud extends to the formation of a wind tunnel between airfoils 41 and the propeller. By this construction the lifting capacity of the system is greatly increased for a given diameter over that obtainable with ordinary helicopter type lifting airfoils.

If a power plant failure should occur on a vertical trajectory or when hovering, airfoils 41 are adjusted to a spiral-glide position to maintain substantial angular momentum in the rotating system of section C. This prevents a free fall as explained below. In this event, the propeller will rotate indifferently while its airfoils 27 will feather, as will be apparent from the disclosure in my said application.

If a power plant failure should occur in more or less horizontal flight, a sufficient glide can be maintained until the elevators 97 are brought into action, so that axis L is brought into a vertical position as above described. Then the airfoils 41 are brought into a position of negative angle of attack so as to increase the angular velocity and angular momentum of the assembly of section C. For example, for a rate of fall of 25 M. P. H. a 200 R. P. M. angular velocity might be maintained by this means. Then at an appropriate low elevation, such as 150 ft., the airfoils 41 would be set to a positive angle of attack so as to convert rotational kinetic energy to energy for braking the fall of the aircraft. Under these conditions, the propeller assembly will again have an indifferent rotation with respect to the compartment 13 and its individual airfoils 27 will tend to feather, as will be apparent from the disclosure in my said application.

The purpose of the slots 2 in the barrel wing 1 is for boundary layer control. They minimize the occurrence of eddys in the boundary layer of air operative on its outside. This occurs because the propeller assembly D induces some reduction in pressure within the barrel wing 1, thus drawing off air from the inner eddying part of the boundary layer of air on the wing surfaces. This improves the streamline form of said outer boundary layer and reduces drag. As shown, the slots 2 preferably spiral outward and rearward, as is clear from the dotted lines showing them in Fig. 2. Means such as sliding gates 4 may be employed for controlling the widths of the openings through the slots.

The barrel type of wing 1 is a safe one, since during turning and tilting maneuvers, which are accomplished gyroscopically, it does not introduce flutter in response to the resulting yawing action of the aircraft. Moreover, the present machine dispenses with a rudder, all controls for maneuvering being attained by operation of the engine throttle, elevators 97, and/or nozzles 75.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An aircraft construction comprising in combination first and second assemblies, bearing means connecting said assemblies adapting them for opposite rotation about an axis of spin, an engine having first and second reactive rotary thrust components, the first assembly comprising a propeller and said first thrust component attached thereto, the second assembly comprising a barrel-shaped wing surrounding said axis of spin, with the second thrust component attached thereto and including at least one lifting airfoil rotatable on an axis which is fixed relative to said second assembly and which extends transversely to said axis of spin, the moment of inertia of said second assembly around said axis of spin being substantially greater than that of the first assembly.

2. An aircraft construction comprising in combination first and second assemblies, bearing means connecting said assemblies adapting them for opposite rotation about an axis of spin, an engine having first and second reactive rotary thrust components, the first assembly comprising a propeller and said first thrust component attached thereto, the second assembly comprising a barrel-shaped wing rotatable on its own axis as an axis of spin and having the second thrust component attached thereto, said second assembly also having airfoils which are rotatably adjustable on axes which are fixed relative to said second assembly and which extend transversely to said axis of spin, the axes of said airfoils being surrounded by said barrel-shaped wing, whereby the wing functions as a surrounding shroud for the airfoils, the moment of inertia of said second assembly around said axis of spin being substantially greater than that of the first assembly.

3. An aircraft construction comprising in combination first and second assemblies, bearing means connecting said assemblies for their opposite rotation about an axis of spin, an engine having first and second reactive rotary thrust components, the first assembly comprising a propeller and said first thrust component attached thereto, the second assembly comprising a barrel-shaped wing surrounding said axis of spin with the second thrust component attached thereto and including at least one lifting airfoil adjustable on an axis extending transversely to said axis of spin, the moment of inertia of said second assembly around said axis of spin being substantially greater than that of the first assembly, a housing having a rotatable connection with said second assembly, and a third assembly mounted for rotation on the housing about said axis of spin, control airfoils rotatably mounted on said third assembly on axes transverse to said axis of spin, and an adjusting mechanism connected to rotate said airfoils whereby said control airfoils may be varied in their attack positions relative to the air through which the aircraft moves to apply torque tending to tilt the axis of spin around an axis of applied torque, whereby the craft will precess about an axis of precession which is at right angles to the axes of spin and of applied torque.

4. An aircraft construction comprising in combination first and second assemblies, bearing means connecting said assemblies for their opposite rotations about an axis of spin, an engine having first and second reactive rotary thrust components, the first assembly comprising a propeller and said first thrust component attached thereto, the second assembly comprising a barrel-shaped wing surrounding said axis of spin with the second thrust component attached thereto and including at least one lifting airfoil adjustable on an axis extending transversely to said axis of spin, the moment of inertia of said second assembly around said axis of spin being substantially greater than that of the first assembly, a housing having a rotatable connection with said second assembly, at least one lateral control airfoil supported by said housing on an axis transverse to the axis of spin, and a control mechanism connected to move said control airfoil around its transverse axis, whereby torque may be applied by air reaction on the control airfoil around an axis of applied torque which is perpendicular to said axis of spin, and whereby the craft will precess about an axis of precession which is at right angles to the axes of spin and of applied torque.

5. An aircraft construction comprising in combination first and second assemblies, bearing means connecting said assemblies for their opposite rotations about an axis of spin, an engine having first and second reactive rotary thrust components, the first assembly comprising a propeller and said first thrust component attached thereto, the second assembly comprising a barrel-shaped wing surrounding said axis of spin with the second thrust component attached thereto and including lifting airfoils adjustable on axes extending transversely to said axis of spin, the moment of inertia of said second assembly around said axis of spin being substantially greater than that of the first assembly, a housing having a rotatable connection with said second assembly, lateral airfoils supported by said housing on axes transverse to the axis of spin, and a control mechanism connected to move said airfoils oppositely or together around their transverse axes, whereby torque may be applied by air reaction on the elevators around an axis of applied torque which is perpendicular to said axis of spin, and whereby the craft will precess about an axis of precession which is at right angles to the axes of spin and of applied torque.

6. An aircraft made according to claim 5, including apparatus constructed to move said axes of the control airfoils relative to the housing and around the axis of spin or hold them fast in a predetermined position relative to the housing.

7. An aircraft made according to claim 6, including apparatus constructed to control the orientation of said housing around said axis of spin when said axes of the control airfoils are held fast thereto.

8. An aircraft construction comprising in combination first and second assemblies, bearing means connecting said assemblies adapting them for opposite rotation about an axis of spin, an engine having first and second reactive rotary thrust components, the first assembly comprising a propeller and said first thrust component attached thereto, the second assembly comprising a barrel-shaped wing surrounding said axis of spin with the second thrust component attached thereto and including lifting airfoils which are rotatably adjustable on axes which are fixed relative to said second assembly and which extend transversely to said axis of spin, said wing surrounding said axis of spin and extending between and surrounding substantial portions of said propeller and airfoils to form a shroud around them and extending therebetween, the moment of inertia of said second assembly around said axis of spin being substantially greater than that of the first assembly.

References Cited in the file of this patent

UNITED STATES PATENTS

| | | |
|---|---|---|
| 1,801,725 | Cook | Apr. 21, 1931 |
| 2,502,045 | Johnson | Mar. 28, 1950 |

FOREIGN PATENTS

| | | |
|---|---|---|
| 1,050,948 | France | Sept. 9, 1953 |